US010387215B2

United States Patent
Liu

(10) Patent No.: US 10,387,215 B2
(45) Date of Patent: Aug. 20, 2019

(54) MOTHERBOARD ANALYSIS DEVICE AND METHOD OF ANALYZING MOTHERBOARD USING SAME

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Cheng-Xiang Liu, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 96 days.

(21) Appl. No.: 15/814,503

(22) Filed: Nov. 16, 2017

(65) Prior Publication Data

US 2018/0307541 A1     Oct. 25, 2018

(30) Foreign Application Priority Data

Apr. 21, 2017 (CN) .......................... 2017 1 0264373

(51) Int. Cl.
| G06F 1/18 | (2006.01) |
| G06F 1/20 | (2006.01) |
| G06F 9/50 | (2006.01) |
| G06T 7/00 | (2017.01) |
| G03B 15/02 | (2006.01) |

(52) U.S. Cl.
CPC ............ *G06F 9/5094* (2013.01); *G06F 1/184* (2013.01); *G06F 1/206* (2013.01); *G06T 7/001* (2013.01); *G03B 15/02* (2013.01)

(58) Field of Classification Search
CPC ........ G06F 9/5094; G06F 1/184; G06F 1/206; G06T 7/001; G06T 5/50; G06T 2207/10048; G06T 2207/20068; G06T 2207/20221; G06T 2207/30141; G03B 15/02; G01J 5/00; H04N 5/23229; H04N 5/235
USPC ....................................................... 348/126
See application file for complete search history.

(56) References Cited

U.S. PATENT DOCUMENTS

| 6,033,107 A * | 3/2000 | Farina .................. G01K 1/02 374/161 |
| 6,377,064 B1 * | 4/2002 | Kurosu ............... G01R 31/01 209/537 |
| 7,100,389 B1 * | 9/2006 | Wayburn ............ F25D 19/006 324/750.08 |

* cited by examiner

*Primary Examiner* — Marnie A Matt
(74) *Attorney, Agent, or Firm* — ScienBiziP, P.C.

(57) ABSTRACT

A method for analyzing a motherboard for detecting an abnormally heated element of the motherboard includes placing the motherboard in a sealable container and powering on the motherboard, adjusting a temperature inside the sealable container to a predetermined temperature/temperature range, capturing a first image of the motherboard under ultraviolet light, capturing a thermal image of the motherboard, calibrating a position of the first image and the thermal image, combining the calibrated first image and the calibrated thermal image into a second image, and carrying out differential and image binarization processing on the second image and a template image to identify an abnormally heated element of the motherboard. A motherboard analysis device is also provided.

14 Claims, 6 Drawing Sheets

MOTHERBOARD ANALYSIS DEVICE AND METHOD OF ANALYZING MOTHERBOARD USING SAME

CROSS-REFERENCE TO RELATED APPLICATIONS

This application claims priority to Chinese Patent Application No. 201710264373.3 filed on Apr. 21, 2017, the contents of which are incorporated by reference herein.

FIELD

The subject matter herein generally relates to a motherboard analysis device and a method for detecting an abnormally heated element of the motherboard.

BACKGROUND

The motherboard is one of the most important components of an electronic device. During research and development of electronic devices, it is important to detect any elements of the motherboard that may become abnormally heated.

BRIEF DESCRIPTION OF THE DRAWINGS

Implementations of the present technology will now be described, by way of example only, with reference to the attached figures.

DETAILED DESCRIPTION

Figure 1:
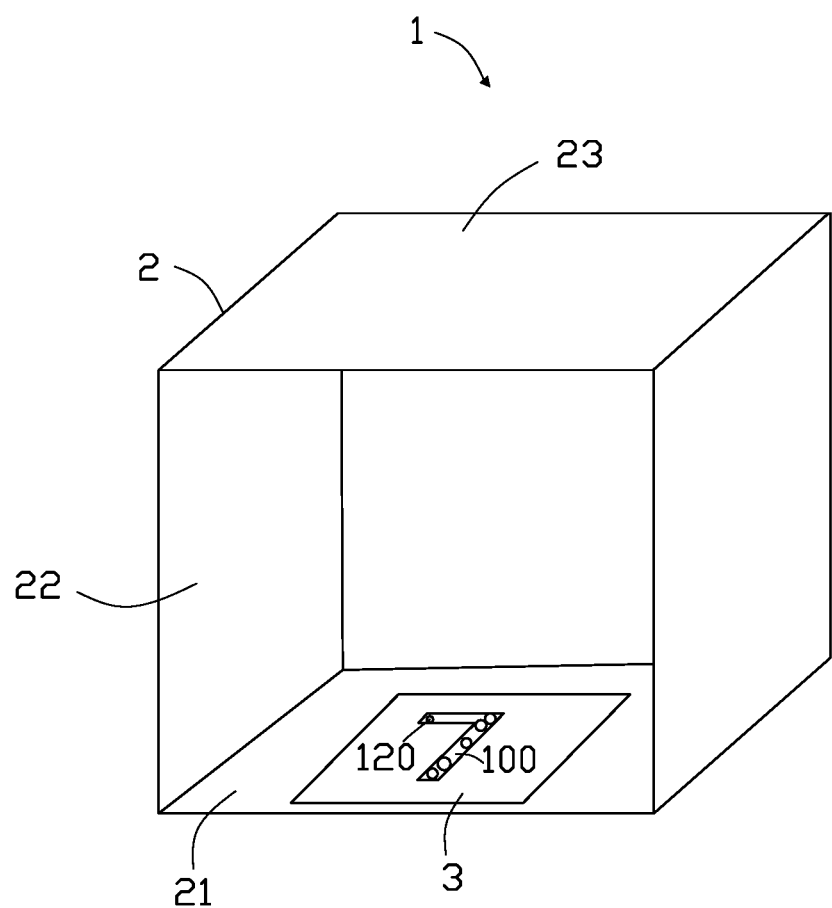
FIG. 1 is a diagrammatic view of an embodiment of a motherboard analysis device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Figure 2:
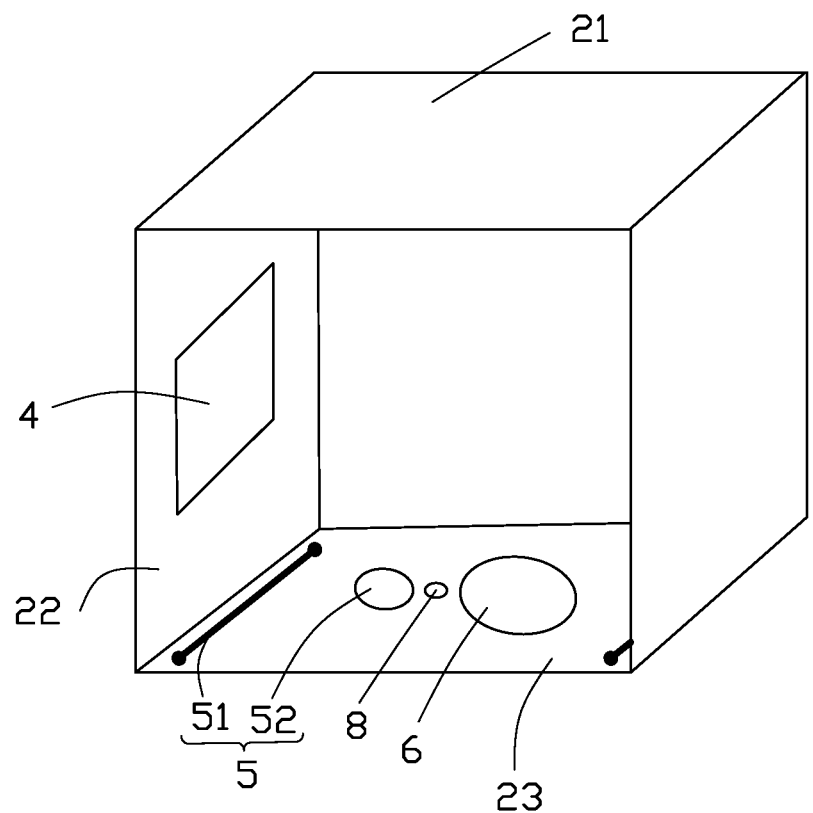
FIG. 2 is similar to FIG. 1 but shown from another angle.

FIGS. 1-2 illustrate an embodiment of a motherboard analysis device 1. The motherboard analysis device 1 can include a sealable container 2 for receiving a motherboard 100 therein. The motherboard analysis device 1 can detect abnormally heated elements of the motherboard 100. The motherboard 100 can include a test heating resistor circuit including a plurality of testing resistors (not shown). A plurality of fixing holes 120 can be defined in the motherboard 100, each fixing hole 120 receiving a corresponding testing resistor therein. The testing resistors are used for emitting heat when the motherboard 100 is powered on to be tested. The testing resistors serve as a heating element of the motherboard 100. A temperature of the testing resistors can be between 50 and 90 degrees Celsius.

The sealable container 2 can include a bottom wall 21, four sidewalls 22 (only two of which are shown), and a top wall 23. Each sidewall 22 can extend perpendicularly from a periphery of the bottom wall 21, and the top wall 23 can cover the sidewall 22 such that the top wall 23 is opposite to the bottom wall 21. A door (not shown) is used to provide access to inside the sealable container 2 as well as seal it closed.

Figure 3:
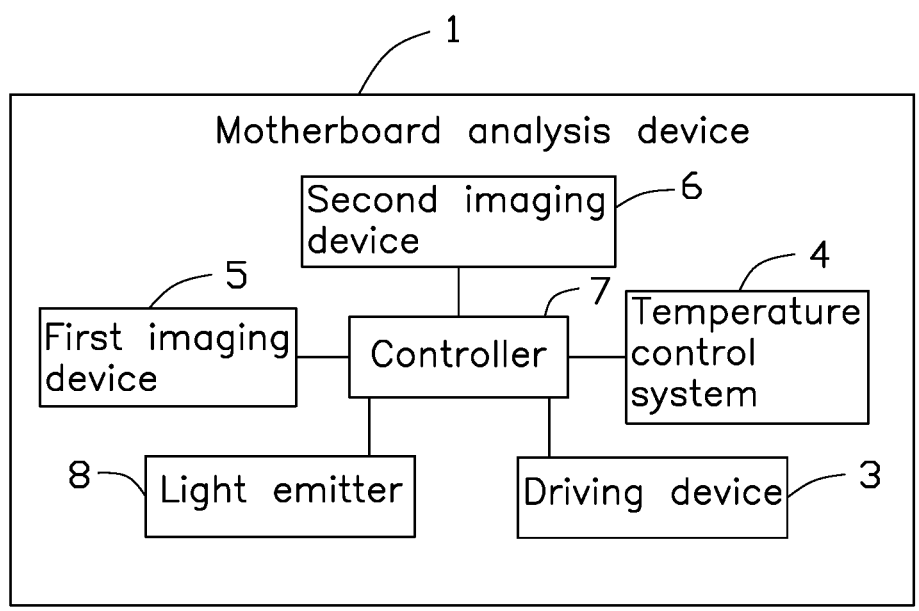
FIG. 3 is a diagrammatic view of components of the motherboard analysis device.

Referring to FIG. 2 and FIG. 3, the motherboard analysis device 1 can include a driving device 3, a temperature control system 4, a first imaging device 5, a second imaging device 6, and a controller 7. The driving device 3 is arranged on the bottom wall 21. The motherboard 100 is arranged on the driving device 3, and the controller 7 can control the driving device 3 to move the motherboard 100 to a predetermined position and turn over the motherboard 100. Such driving devices are known in the art, so the driving device 3 will not be described further here.

The temperature control system 4 can be arranged on the sidewall 22. In at least one embodiment, the temperature control system 4 can cool the temperature inside the sealable container 2 in a method similar to that used by, for example, a refrigerator. The controller 7 can control the temperature control system 4 to adjust a temperature inside the sealable container 2 to a predetermined temperature/temperature range. In at least one embodiment, the predetermined temperature is -15 degrees Celsius.

The first imaging device 5 can include two lighting devices 51 and a camera 52. The two lighting devices 51 can be arranged on the top wall 23. The camera 52 can be arranged on the top wall 23 and spaced a predetermined distance from the two lighting devices 51 according to requirements of capturing a usable image of the motherboard 100. In at least one embodiment, the lighting devices 51 are ultraviolet lighting devices. The camera 52 is used for capturing a first image of the motherboard 100 while the lighting devices 51 emit ultraviolet light on the motherboard 100. The camera 52 can send the first image to the controller 7. In at least one embodiment, the camera 52 is a macro camera.

In at least one embodiment, the second imaging device 6 can be a macro infrared camera. The second imaging device 6 can be arranged on the top wall 23 and spaced a predetermined distance from the camera 52 according to a requirement of capturing a usable thermal image of the motherboard 100. The second imaging device 6 can send the thermal image to the controller 7.

The controller 7 can control the temperature control system 4 to adjust a temperature inside the sealable container 2 to the predetermined temperature/temperature range. Then, the controller 7 can control the driving device 3 to move the motherboard 100 to the predetermined position, which is a position allowing for the first and second imaging devices to capture good images. The controller 7 can receive the first image from the camera 52 and receive the thermal image from the second imaging device 6 and calibrate a position of the first image and the thermal image. Then, the controller 7 can combine the calibrated first image and the calibrated thermal image into a second image and carry out differential and image binarization processing on the second image and a template image to identify an abnormally heated element of the motherboard 100. The first image and the thermal image can be taken when the motherboard 100 is powered on, and the template image can be composed of the first image and the thermal image taken when the motherboard 100 is powered off. In at least one embodiment, the controller 7 can be a central processing unit, a microprocessor, or any other processing chip.

In at least one embodiment, the controller 7 combines the second image with a component location image of the motherboard 100, and then carries out differential and image binarization processing on the combined second image and component location image and the template image to identify an abnormally heated element of the motherboard 100.

In at least one embodiment, the motherboard analysis device 1 can further include a light emitter 8 arranged on the top wall 23 between the camera 52 and the second imaging device 6. In at least one embodiment, the light emitter 8 is located at a center point between the camera 52 and the second imaging device 6. The light emitter 8 can be used for emitting infrared light on the mother board 100 to create a red spot on the motherboard 100. The red spot can appear in both the first image and the thermal image for assisting the controller 7 in calibrating the first image and the thermal image.

In detail, the controller 7 can first carry out binarization processing on the first image and define a first area of the first image as having the red spot, and then carry out binarization processing on the thermal image and define a second area of the thermal image as having the red spot. The controller 7 can carry out expansion and corrosion treatment processing on the first area to obtain a first unified area, and carry out expansion and corrosion treatment processing on the second area to obtain a second unified area. Then, the controller 7 can project the first unified area separately on an X-axis and Y-axis to obtain a third image having the red spot in the center, and project the second unified area separately on an X-axis and Y-axis to obtain a fourth image having the red spot in the center. Finally, the controller 7 can compare a position of the red spot in the third image and the fourth image to complete calibration of the first image and thermal image.

In at least one embodiment, a process of combining the first image and the thermal image into the second image includes the processor 7 first cropping the third image to obtain a fifth image and setting an opacity of the fifth image to a first predetermined opacity value, and then cropping the fourth image to obtain a sixth image and setting an opacity of the sixth image to a second predetermined opacity value, and finally combining the fifth image and the sixth image to obtain the second image. In at least one embodiment, the first predetermined opacity value is 40%, and the second opacity value is 60%.

Figure 4:
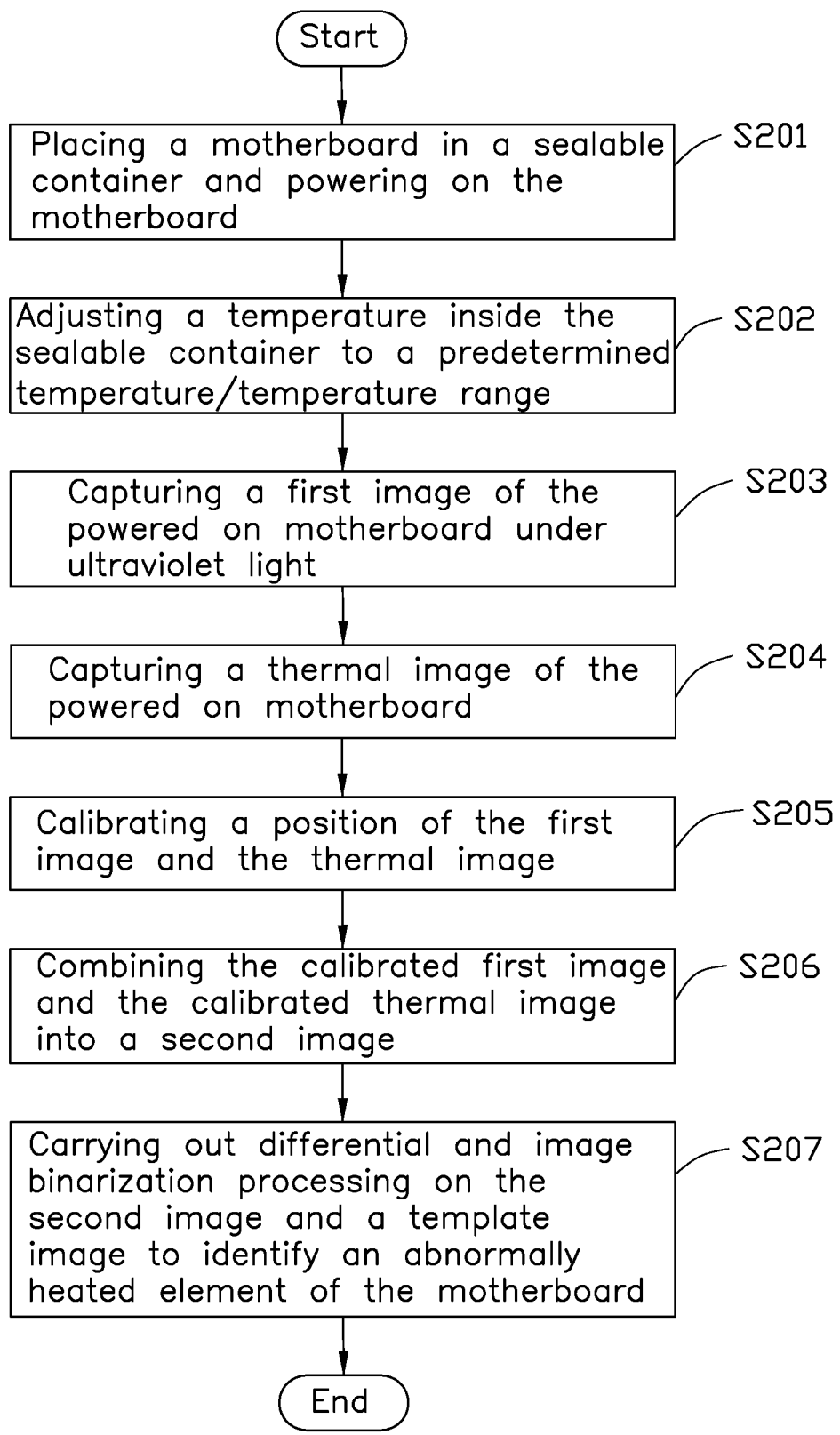
FIG. 4 is a flowchart of an exemplary method for analyzing a motherboard.

FIG. 4 illustrates a flowchart of an exemplary method for analyzing a motherboard. The example method is provided by way of example, as there are a variety of ways to carry out the method. The method described below can be carried out using the configurations illustrated in FIGS. 1-3, for example, and various elements of these figures are referenced in explaining the example method. Each block shown in FIG. 4 represents one or more processes, methods, or subroutines carried out in the example method. Furthermore, the illustrated order of blocks is by example only, and the order of the blocks can be changed. Additional blocks can be added or fewer blocks can be utilized, without departing from this disclosure. The example method can begin at block S201.

In block S201, a motherboard is placed in a sealable container, the sealable container is sealed, and the motherboard is powered on.

In block S202, a temperature inside the sealable container is adjusted by a temperature control system to a predetermined temperature/temperature range.

In block S203, a first image of the powered on motherboard is captured by a first imaging device under ultraviolet light.

In block S204, a thermal image of the powered on motherboard is captured by a second imaging device.

In block S205, a position of the first image and the thermal image is calibrated.

In block S206, the calibrated first image and the calibrated thermal image are combined into a second image.

In block S207, differential and image binarization processing are carried out on the second image and a template image of a powered off motherboard to identify an abnormally heated element of the motherboard. The template image can be composed of the first image and the thermal image taken when the motherboard is not powered on.

In at least one embodiment, the motherboard can include a heating resistor circuit including a plurality of resistors. A plurality of fixing holes can be defined in the motherboard, each fixing hole receiving a corresponding resistor therein. The resistors are used for emitting heat when the motherboard is powered on to be tested. A temperature of the resistors can be between 50 and 90 degrees Celsius.

Figure 5:
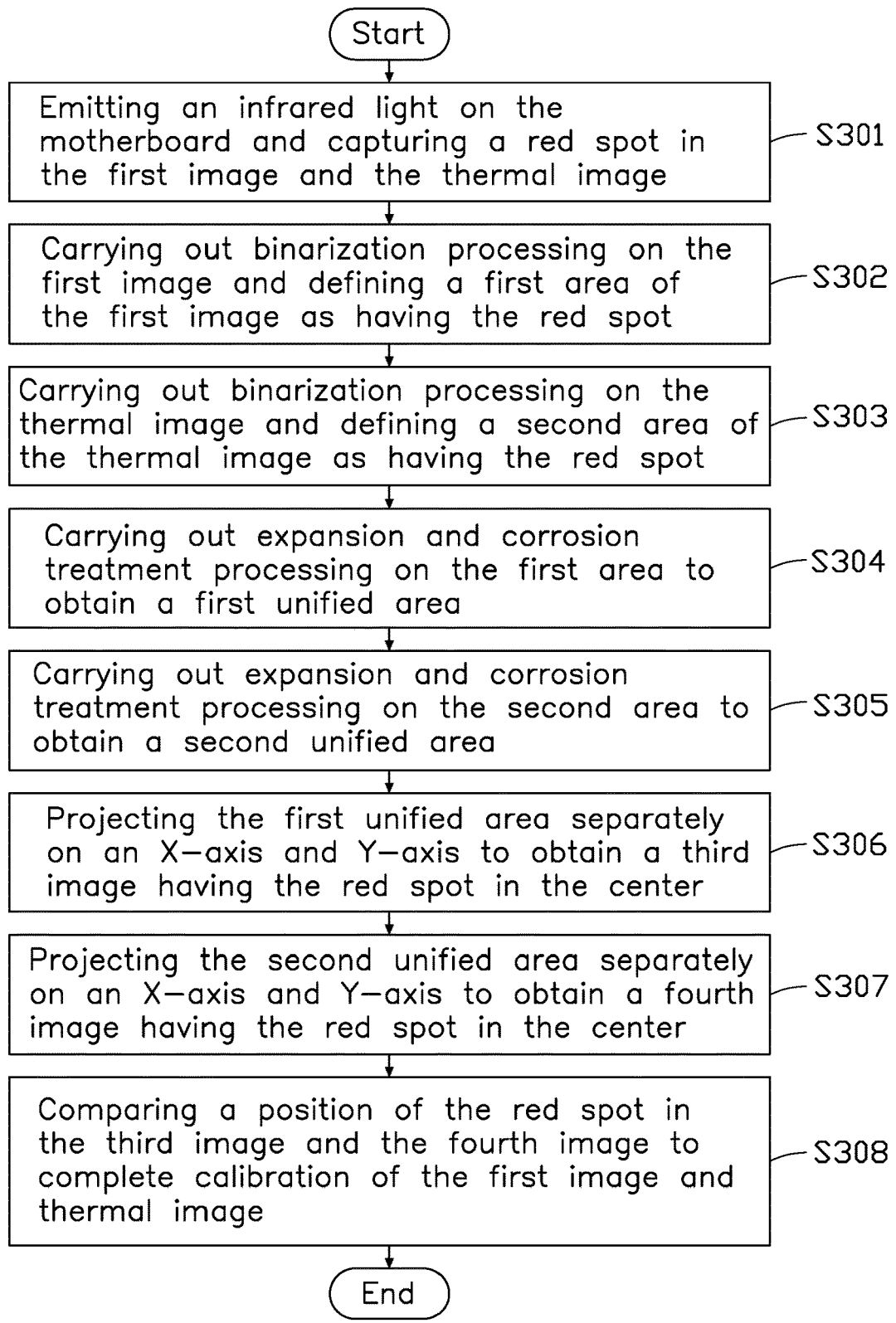
FIG. 5 is a flowchart of an exemplary method for calibrating a first image and a thermal image of the motherboard.

FIG. 5 illustrates a flowchart of an exemplary method for calibrating the first image and the thermal image. The example method is provided by way of example, as there are a variety of ways to carry out the method. The method described below can be carried out using the configurations illustrated in FIGS. 1-3, for example, and various elements of these figures are referenced in explaining the example method. Each block shown in FIG. 5 represents one or more processes, methods, or subroutines carried out in the example method. Furthermore, the illustrated order of blocks is by example only, and the order of the blocks can be changed. Additional blocks can be added or fewer blocks can be utilized, without departing from this disclosure. The example method can begin at block S301.

At block S301, an infrared light is emitted by a light emitter to emit a red spot on the motherboard. The red spot is captured in the first image and the thermal image.

At block S302, binarization processing is carried out on the first image and a first area of the first image is defined as having the red spot.

At block S303, binarization processing is carried out on the thermal image and a second area of the thermal image is defined as having the red spot.

At block S304, expansion and corrosion treatment processing is carried out on the first area to obtain a first unified area.

At block S305, expansion and corrosion treatment processing is carried out on the second area to obtain a second unified area.

At block S306, the first unified area is projected separately on an X-axis and Y-axis to obtain a third image having the red spot in the center.

At block S307, the second unified area is projected separately on an X-axis and Y-axis to obtain a fourth image having the red spot in the center.

At block S308, a position of the red spot in the third image is compared to a position of the red spot in the fourth image to complete calibration of the first image and thermal image.

Figure 6:
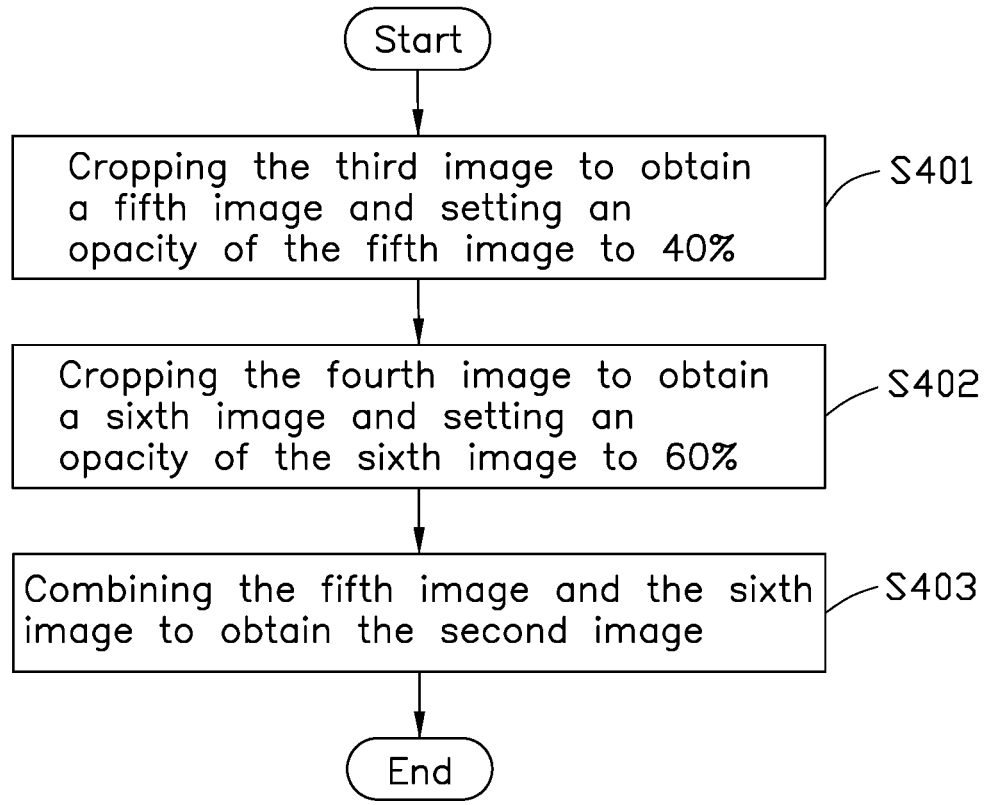
FIG. 6 is a flowchart of an exemplary method for combining the first image and the thermal image into a second image.

FIG. 6 illustrates a flowchart of an exemplary method for combining the first image and the thermal image into the second image. The example method is provided by way of example, as there are a variety of ways to carry out the method. The method described below can be carried out using the configurations illustrated in FIGS. 1-3, for example, and various elements of these figures are referenced in explaining the example method. Each block shown in FIG. 6 represents one or more processes, methods, or subroutines carried out in the example method. Furthermore, the illustrated order of blocks is by example only, and the order of the blocks can be changed. Additional blocks can be added or fewer blocks can be utilized, without departing from this disclosure. The example method can begin at block S401.

At block S401, the third image is cropped to obtain a fifth image and an opacity of the fifth image is set to 40%.

At block S402, the fourth image is cropped to obtain a sixth image and an opacity of the sixth image is set to 60%.

At block S403, the fifth image and the sixth image are combined to obtain the second image.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A motherboard analysis device for detecting an abnormally heated element of a motherboard, the motherboard analysis device comprising:
   a sealable container comprising a bottom wall, a side wall extending perpendicularly from a periphery of the bottom wall, and a top wall covering the side wall and opposite to the bottom wall;
   a temperature control system arranged inside the sealable container;
   a driving device arranged on the bottom wall and configured for moving the motherboard to a predetermined position in the sealable container;
   a first imaging device arranged inside the sealable container and comprising a lighting device and a camera, the lighting device used for emitting ultraviolet light on the motherboard, and the camera used for capturing a first image of the motherboard;
   a second imaging device arranged inside the sealable container and used for capturing a thermal image of the motherboard; and
   at least one controller configured to:
      control the temperature control system to adjust a temperature inside the sealable container to a predetermined temperature or a predetermined temperature range;
      receive the first image from the first imaging device;
      receive the thermal image from the second imaging device;
      calibrate a position of the first image and the thermal image;
      combine the calibrated first image and the calibrated thermal image into a second image; and
      carry out differential and image binarization processing on the second image and a template image to identify an abnormally heated element of the motherboard.

2. The motherboard analysis device of claim 1, wherein the first image and the thermal image are taken when the motherboard is powered on, and the template image is composed of the first image and the thermal image taken when the motherboard is powered off.

3. The motherboard analysis device of claim 2, wherein the controller combines the second image with a component location image of the motherboard, and then compares the combined second image and component location image to the template image and carries out differential and image binarization processing on the combined second image and component location image and the template image to identify an abnormally heated element of the motherboard.

4. The motherboard analysis device of claim 2, wherein a plurality of fixing holes is defined in the motherboard; each fixing hole receives a corresponding testing resistor of a test heating resistor circuit therein; the plurality of testing resistors serve as a heating element of the motherboard and are used for emitting heat when the motherboard is powered on to be tested; a temperature of the resistors is between 50 and 90 degrees Celsius.

5. The motherboard analysis device of claim 2 further comprising a light emitter for emitting infrared light and creating a red spot on the motherboard, the red spot appearing in both the first image and the thermal image, wherein the controller is further configured to:
   carry out binarization processing on the first image and define a first area of the first image as having the red spot;
   carry out binarization processing on the thermal image and define a second area of the thermal image as having the red spot;
   enlarge and etch the first area to obtain a first unified area;
   enlarge and etch the second area to obtain a second unified area;
   project the first unified area separately on an X-axis and Y-axis to obtain a third image having the red spot in the center;
   project the second unified area separately on an X-axis and Y-axis to obtain a fourth image having the red spot in the center; and
   compare a position of the red spot in the third image and the fourth image to complete calibration of the first image and thermal image.

6. The motherboard analysis device of claim 5, wherein the controller is further configured to:
   crop the third image to obtain a fifth image and set an opacity of the fifth image to a first predetermined opacity value;
   crop the fourth image to obtain a sixth image and set an opacity of the sixth image to a second predetermined opacity value; and
   combine the fifth image and the sixth image to obtain the second image.

7. The motherboard analysis device of claim 6, wherein the opacity of the fifth image is 40%, and the opacity of the sixth image is 60%.

8. A method for analyzing a motherboard for detecting an abnormally heated element, the method comprising:
   placing the motherboard in a sealable container and powering on the motherboard;
   adjusting a temperature inside the sealable container to a predetermined temperature/temperature range;

capturing a first image of the motherboard under ultraviolet light;

capturing a thermal image of the motherboard;

calibrating a position of the first image and the thermal image;

combining the calibrated first image and the calibrated thermal image into a second image; and carrying out differential and image binarization processing on the second image and a template image to identify an abnormally heated element of the motherboard.

9. The method of claim 8, wherein the template image is composed of the first image and the thermal image taken when the motherboard is powered off.

10. The method of claim 9 further comprising combining the second image with a component location image of the motherboard, and then carrying out differential and image binarization processing on the combined second image and component location image and the template image to identify an abnormally heated element of the motherboard.

11. The method of claim 9, wherein a plurality of fixing holes is defined in the motherboard; each fixing hole receives a corresponding testing resistor of a test heating resistor circuit therein; the plurality of testing resistors serve as a heating element of the motherboard and are used for emitting heat when the motherboard is powered on to be tested; a temperature of the resistors is between 50 and 90 degrees Celsius.

12. The method of claim 9 further comprising:

providing a light emitter for emitting infrared light and creating a red spot on the motherboard, the red spot appearing in both the first image and the thermal image;

carrying out binarization processing on the first image and defining a first area of the first image as having the red spot;

carrying out binarization processing on the thermal image and defining a second area of the thermal image as having the red spot;

enlarging and etching the first area to obtain a first unified area;

enlarging and etching the second area to obtain a second unified area;

projecting the first unified area separately on an X-axis and Y-axis to obtain a third image having the red spot in the center;

projecting the second unified area separately on an X-axis and Y-axis to obtain a fourth image having the red spot in the center; and comparing a position of the red spot in the third image and the fourth image to complete calibration of the first image and thermal image.

13. The method of claim 12 further comprising:

cropping the third image to obtain a fifth image and setting an opacity of the fifth image to a first predetermined opacity value;

cropping the fourth image to obtain a sixth image and setting an opacity of the sixth image to a second predetermined opacity value; and combining the fifth image and the sixth image to obtain the second image.

14. The method of claim 13, wherein the opacity of the fifth image is 40%, and the opacity of the sixth image is 60%.

* * * * *